(12) United States Patent
Black et al.

(10) Patent No.: US 9,863,404 B2
(45) Date of Patent: Jan. 9, 2018

(54) HIGH EFFICIENCY SOLAR POWER GENERATOR FOR OFFSHORE APPLICATIONS

(71) Applicant: Saudi Arabian Oil Company, Dhahran (SA)

(72) Inventors: Michael John Black, Dhahran (SA); Abubaker Saeed, Dhahran (SA)

(73) Assignee: Saudi Arabian Oil Company (SA)

( * ) Notice: Subject to any disclaimer, the term of this patent is extended or adjusted under 35 U.S.C. 154(b) by 678 days.

(21) Appl. No.: 14/288,520

(22) Filed: May 28, 2014

(65) Prior Publication Data

US 2014/0354055 A1 Dec. 4, 2014

Related U.S. Application Data

(60) Provisional application No. 61/828,585, filed on May 29, 2013.

(51) Int. Cl.
*F03G 6/00* (2006.01)
*F03G 6/06* (2006.01)
(Continued)

(52) U.S. Cl.
CPC .............. *F03G 6/001* (2013.01); *F03G 6/068* (2013.01); *F24J 2/1057* (2013.01); *F24J 2/12* (2013.01);
(Continued)

(58) Field of Classification Search
CPC ............... F03G 6/001; F03G 2006/061; F03G 2006/062; F03G 6/068; Y02E 10/40; Y02E 10/50; H02J 1/10; F24J 2002/1061
(Continued)

(56) References Cited

U.S. PATENT DOCUMENTS

| 4,700,013 A | 10/1987 | Soule |
| 5,228,293 A | 7/1993 | Vitale |

(Continued)

FOREIGN PATENT DOCUMENTS

| WO | 2008/0015064 A2 | 2/2008 |
| WO | 2012/0038566 A1 | 3/2012 |
| WO | 2012/0085066 A2 | 6/2012 |

OTHER PUBLICATIONS

PCT International Search Report and the Written Opinion; dated Feb. 6 2015; International Application No. PCT/US2014/039670; International File Date: May 28, 2014.

*Primary Examiner* — Rexford Barnie
*Assistant Examiner* — Thai Tran
(74) *Attorney, Agent, or Firm* — Bracewell LLP; Constance Gall Rhebergen

(57) ABSTRACT

A dual-type solar power generator comprising a dual capture panel. The dual capture panel comprises a reflective surface configured to reflect solar radiation having a reflecting wavelength and an absorbent surface configured to absorb solar radiation having an absorbent wavelength to create a released electron stream. A thermal transfer unit comprising a receiving zone configured to absorb heat energy, a heat engine that converts the heat energy to mechanical work energy, and a generator configured to convert the mechanical work energy to an electric current, an electric conditioning system comprising an electrical buffer configured to prevent a cross flow of the released electron stream and the electric current, a power converter configured to equalize a released electron stream voltage with an electric current voltage, an electrical connector configured to combine the released stream voltage with the electric current voltage to create a power source.

13 Claims, 3 Drawing Sheets

(51) Int. Cl.
  *F24J 2/10* (2006.01)
  *F24J 2/12* (2006.01)
  *H02S 10/00* (2014.01)
  *H02S 20/32* (2014.01)
  *F24J 2/07* (2006.01)

(52) U.S. Cl.
  CPC .............. *H02S 10/00* (2013.01); *H02S 20/32* (2014.12); *F03G 2006/062* (2013.01); *F24J 2/07* (2013.01); *Y02E 10/42* (2013.01); *Y02E 10/46* (2013.01); *Y02E 10/52* (2013.01); *Y10T 307/50* (2015.04)

(58) Field of Classification Search
  USPC ........................................................ 136/248
  See application file for complete search history.

(56) References Cited

U.S. PATENT DOCUMENTS

| | | |
|---|---|---|
| 5,298,087 A | 3/1994 | Sichanugrist et al. |
| 5,578,140 A | 11/1996 | Yogev et al. |
| 5,932,029 A | 8/1999 | Stone et al. |
| 6,775,982 B1 | 8/2004 | Kitamura et al. |
| 6,818,818 B2 | 11/2004 | Bareis |
| 6,979,911 B2 | 12/2005 | Otting et al. |
| 7,026,722 B1 | 4/2006 | Otting et al. |
| 7,084,518 B2 | 8/2006 | Otting et al. |
| 7,888,589 B2 | 2/2011 | Mastromatteo |
| 8,151,568 B2 | 4/2012 | Fraser et al. |
| 2003/0101565 A1 | 6/2003 | Butler |
| 2004/0055631 A1* | 3/2004 | Szymocha ................ F24J 2/05 136/243 |
| 2004/0098986 A1* | 5/2004 | Litwin .................... F03G 6/003 60/641.8 |
| 2006/0054212 A1 | 3/2006 | Fraas et al. |
| 2006/0055175 A1 | 3/2006 | Grinblat |
| 2008/0053513 A1 | 3/2008 | Palmer |
| 2008/0115817 A1 | 5/2008 | Defries |
| 2008/0121272 A1* | 5/2008 | Besser ...................... G05F 1/67 136/248 |
| 2008/0230111 A1 | 9/2008 | Uehlin |
| 2008/0236652 A1 | 10/2008 | Defries et al. |
| 2009/0014053 A1* | 1/2009 | Schulz ..................... F21S 11/00 136/246 |
| 2009/0242028 A1 | 10/2009 | Origlia et al. |
| 2009/0260619 A1 | 10/2009 | Bailey et al. |
| 2009/0314926 A1* | 12/2009 | Hinderling .............. B63B 35/44 250/203.4 |
| 2010/0043778 A1 | 2/2010 | Penciu |
| 2010/0182809 A1 | 7/2010 | Cullinane et al. |
| 2010/0269817 A1 | 10/2010 | Kelly |
| 2010/0319680 A1 | 12/2010 | Kelly |
| 2011/0017274 A1 | 1/2011 | Huang et al. |
| 2011/0186106 A1 | 8/2011 | Parker et al. |
| 2011/0192460 A1 | 8/2011 | Tan |
| 2011/0209476 A1 | 9/2011 | Chae |
| 2011/0277472 A1 | 11/2011 | Chae |
| 2015/0083194 A1* | 3/2015 | Matsushima .......... F24J 2/1057 136/248 |

* cited by examiner

HIGH EFFICIENCY SOLAR POWER GENERATOR FOR OFFSHORE APPLICATIONS

FIELD OF THE INVENTION

This invention relates to a system and process for dual-type solar power generation. Specifically, the present invention relates to a dual capture panel using both photovoltaics and a concentrating solar power system to generate electricity.

BACKGROUND OF THE INVENTION

Supplying power to remote locations, such as an offshore platform, is costly. While possible, transmitting electricity from land to an offshore platform is costly because of the capital required to transmit electricity over long distances. Transmission to offshore platforms requires new transmission lines and other equipment. Additionally, due to the remote nature of the transmission lines themselves, repairs are difficult. Onsite methods of power generation are generally not a better option due to the need to minimize the footprint of the equipment, the footprint being the area measured on the ground that the equipment requires. A smaller footprint often means reduced electricity capability.

Solar power provides an alternative method for powering remote systems. Solar power systems have increased in efficiency and can be precisely engineered to provide the needed power output without producing excess capacity.

Conventional solar power systems include concentrating solar power systems and photovoltaic systems. Concentrating solar power systems focus sunlight using mirror arrays to heat a fluid. The heat in the fluid is converted to electricity, for example by a steam turbine. Such systems make it possible to generate up to 300 MW or more of electricity. Electricity generation on this scale requires a large footprint for the mirror array. With the exception of the dish systems, most mirror arrays of concentrating solar power systems are spread over many acres.

One dish system produces less electricity than other concentrating solar power systems, even as little as 3 kW. While, multiple dish systems can be incorporated into a solar power plant to generate significant quantities of electricity, the advantage of the dish system is that one system can be used to generate power. An added advantage is that One dish system requires only a fraction of the footprint required by other concentrating solar power systems.

In contrast to concentrating solar power systems, photovoltaic systems create a current directly from sunlight, due to the photovoltaic effect: the excitation of electrons in certain substances creates a current. A photovoltaic system (array), includes a number of modules, each module formed from photovoltaic cells. The size of a photovoltaic system is determined by the amount of electricity desired, each photovoltaic cell generates about 2 W. Photovoltaic cells are ideal for small electronics or those that have minimal power requirements. If electricity needs are greater, photovoltaic systems can be installed, but will require a larger footprint. In addition, photovoltaic cells have relatively low efficiency.

There is a need for a system that has increased efficiency over photovoltaic cells, has a small footprint, and produces a significant amount of power. Such a system would provide electricity with reduced capital and maintenance costs compared to other paths for supplying power to remote locations.

SUMMARY OF THE INVENTION

The present invention relates to a system and process for dual-type solar power generation.

One aspect of the present invention relates to a dual-type solar power generator. The dual-type solar power generator includes a dual capture panel, where the dual capture panel includes a reflective surface, where the reflective surface is configured to reflect solar radiation having a reflecting wavelength to create a reflected stream and an absorbent surface, where the absorbent surface is configured to absorb solar radiation having an absorbent wavelength to create a released electron stream. The dual-type solar power generator also includes a thermal transfer unit. The thermal transfer unit includes a receiving zone being configured to receive the reflected stream and to absorb heat energy from the reflected stream, a heat engine, the heat engine being in thermal communication with the receiving zone, where the heat engine converts the heat energy absorbed by the receiving zone and converts the heat energy to mechanical work energy, and a generator, the generator in mechanical communication with the heat engine, where the generator is configured to convert the mechanical work energy to an electric current. The dual-type solar power generator includes an electric conditioning system, the electric conditioning system in electrical communication with the released electron stream and the electric current, the electric conditioning system includes an electrical buffer, the electrical buffer configured to prevent a cross flow of the released electron stream and the electric current, a dc-to-dc converter, the dc-to-dc converter configured to equalize a released electron stream voltage with an electric current voltage, and an electrical connector, the electrical connector configured to combine the released stream voltage with the electric current voltage to create a power source.

In certain embodiments, the dual capture panel has a parabolic shape with a focus point. In certain embodiments, the receiving zone is positioned at the focus point. In certain embodiments, the reflecting wavelength reflected by the reflective surface is greater than 1000 nm. In certain embodiments, the absorbent wavelength absorbed by the absorbent surface is less than 1000 nm. In certain embodiments, the absorbent surface includes a photovoltaic cell, where the photovoltaic cell is selected from the group consisting of mesh filter, interference filter, diffraction grating, and combinations thereof. In certain embodiments, the absorbent surface forms a layer contacting the reflective surface and positioned between the reflective surface and the thermal transfer unit. In certain embodiments, the receiving zone includes a fluid tank, wherein a fluid receives the heat energy to create heated fluid, the fluid tank being fluidly connected to the heat engine. in certain embodiments, the heat engine is a Stirling Engine. In certain embodiments, the electric buffer comprises a first diode in the released electron stream and a second diode in the electric current. In certain embodiments, the dual-type solar power generator includes a tracking system, the tracking system configured to orient the dual capture panel toward a source of the solar radiation. In certain embodiments, the dual-type solar power generator is operable to power a plurality of sensors. In certain embodiments, the dual-type solar power generator is used on an offshore platform.

A second aspect of the present invention relates to a method of generating dual-type solar power. The method includes the steps of capturing solar radiation with a dual capture panel, where the dual capture panel includes a reflecting surface and an absorbent surface, reflecting solar radiation having a reflecting wavelength with the reflecting surface to create a reflected stream, absorbing solar radiation having an absorbent wavelength with the absorbent surface to create a released electron stream, and converting a solar energy of the reflected stream to an electric current in a thermal transfer unit. The thermal transfer unit includes a receiving zone, a heat engine, and a generator. Converting the solar energy to an electric current in the thermal transfer unit includes the steps of heating a fluid in the receiving zone with the reflected stream to create a heated fluid having a heat energy, converting the heat energy of the heated fluid to mechanical work energy in the heat engine, the heat engine being fluidly connected to the receiving zone, and converting the mechanical work energy to the electric current in it generator, the generator being mechanically connected to the heat engine. The method further includes combining the electric current and the released electron stream in an electric conditioning system. The electric conditioning system includes an electrical buffer configured to prevent a cross flow of the released electron stream and the electric current, a dc-to-dc converter, the dc-to-dc converter configured to equalize a released electron stream voltage with an electric current voltage, and an electrical connector, the electrical connector configured to combine the released stream voltage with the electric current voltage to create a power supply.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

While the invention will be described with several embodiments, it is understood that one of ordinary skill in the relevant art will appreciate that many examples, variations and alterations to the apparatus and methods described herein are within the scope and spirit of the invention. Accordingly, the exemplary embodiments of the invention described herein are set forth without any loss of generality, and without imposing limitations, on the claimed invention.

Figure 1:
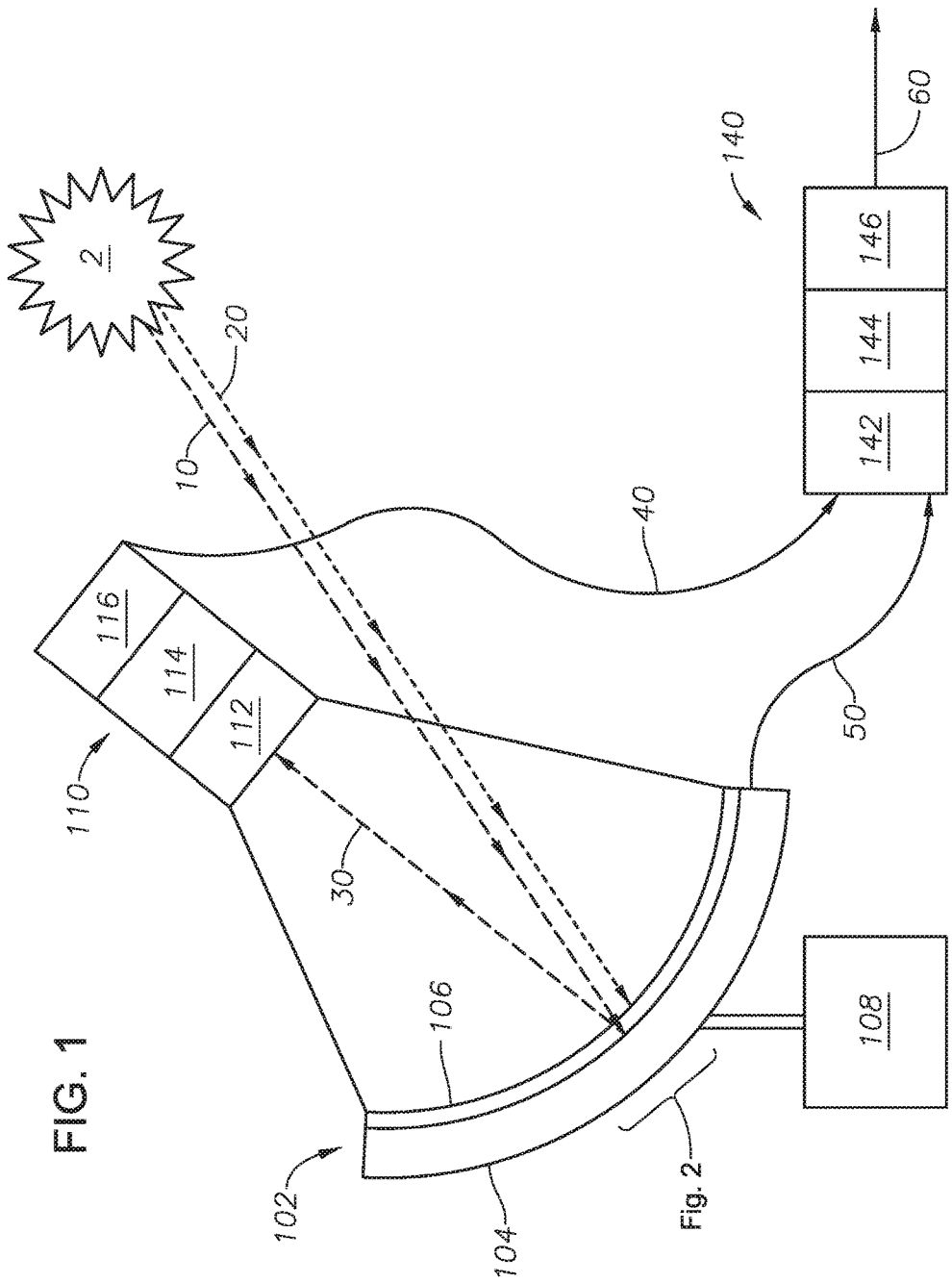
FIG. 1 is a schematic of an embodiment of the present invention.

FIG. 1 provides a schematic of an embodiment of the present invention. Dual-type solar power generator 100 includes dual capture panel 102. Dual capture panel 102 is designed to reflect reflecting wavelengths of solar radiation and to absorb absorbent wavelengths of solar radiation from solar radiation source 2. In a preferred embodiment, dual capture panel 102 has a parabolic shape. In an alternate embodiment, dual capture panel 102 includes one or more flat panels (not shown) arranged in a parabolic shape. Dual capture panel 102 includes reflective surface 104 and absorbent surface 106.

Reflective surface 104 reflects solar radiation having reflective wavelength 10 to create reflected stream 30. Reflective surface 104 is any type of surface capable of reflecting solar radiation. In at least one embodiment, reflective surface 104 is a mirrored surface, certain embodiments, reflective surface 104 is a number of mirrored panels joined together. Reflective surface 104 has the same shape as dual capture panel 102. In at least one embodiment of the present invention, reflective surface 104 is a coating on a surface of dual capture panel 102.

Reflective surface 104 is designed to reflect reflecting wavelength 10 as reflected stream 30 to a focus point (not shown) of the dual capture panel 102. It will be appreciated by one of skill in the art that the focus point of dual capture panel 102 is established based on the diameter of the panel and the desired reflecting wavelength 10. It will be appreciated by one of skill in the art that the focus point need not be a specific point, but can be a region, zone, or other two-dimensional area. The focus point concentrates reflected solar radiation at one location. Reflecting wavelength 10 can be any wavelength of solar radiation. One of skill in the art will appreciate that solar radiation contains wavelengths across the spectrum of light and that for purposes of the present invention reference to a specific wavelength encompasses a range of wavelengths. In a preferred embodiment, for example, reflective surface 104 is designed to reflect reflecting wavelength 10 having a wavelength greater than 1000 nm. It is to be understood that in this embodiment, reflecting wavelength 10 encompasses all wavelengths present in solar radiation that have a wavelength greater than 1000 nm.

Dual capture panel 102 includes absorbent surface 106. Absorbent surface 106 absorbs solar radiation having absorbent wavelength 20. Absorbent surface 106 is any type of surface capable of absorbing solar radiation. In at least one embodiment, absorbent surface 106 includes photovoltaic (PV) cells (not shown). In certain embodiments, the photovoltaic cells include a mesh filter, an interference filter, diffraction grating, or a combination thereof Absorbent surface 106 is designed to absorb absorbent wavelength 20 and allow reflecting wavelength 10 to pass there through, Absorbent wavelength 20 can be any wavelength of solar radiation. One of skill in the art will appreciate that solar radiation contains wavelengths across the spectrum of light and that for purposes of the present invention reference to a specific wavelength encompasses a range of wavelengths. In a preferred embodiment, for example, absorbent surface 106 is designed to absorb absorbent wavelength 20 having a wavelength less than 1000 nm. It is to be understood that in this embodiment, absorbent wavelength 20 encompasses all wavelengths present in solar radiation that have a wavelength less than 1000 nm.

Figure 2:
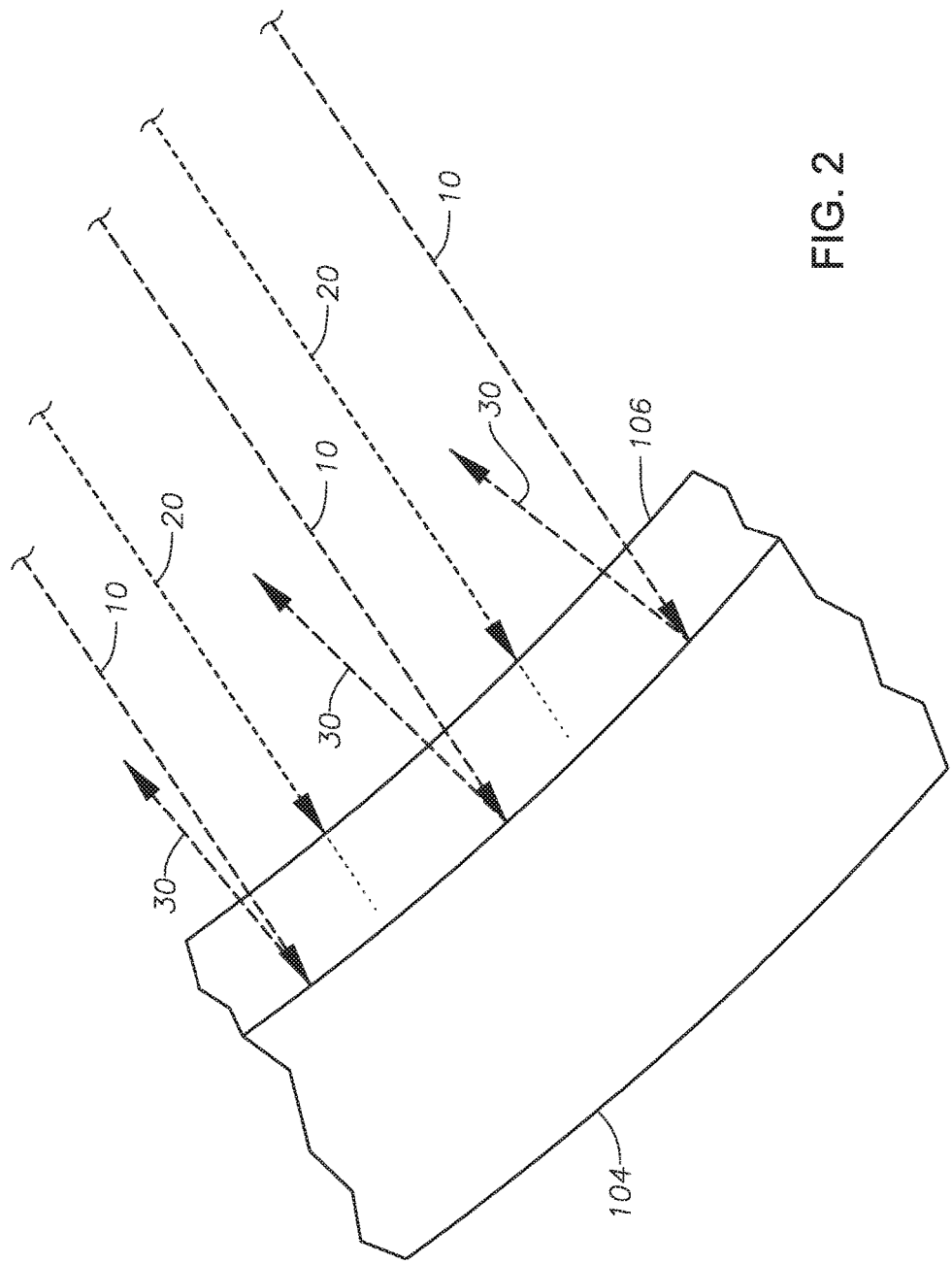
FIG. 2 depicts the dual capture panel reflecting wavelengths of solar radiation and absorbing wavelengths of solar radiation.

The relationship between reflective surface 104 and absorbent surface 106 can be appreciated with reference to FIG. 2. FIG. 2 depicts one embodiment of the present invention, in which, reflecting wavelength 10 passes through absorbent surface 106 and is reflected from reflective surface 104 to create reflected stream 30. Concurrently, absorbent surface 106 absorbs absorbent wavelength 20.

Referring again to FIG. 1, absorbent surface 106 generates released electron stream 50 due to the photovoltaic effect. Thus, absorbent surface 106 is designed to exhibit the photovoltaic effect for a specific wavelength of solar radiation. The voltage of released electron stream 50 is a result of the properties of absorbent surface 106. In one embodiment of the present invention, released electron stream 50 provides direct power without further conditioning.

In one embodiment of the present invention, absorbent surface 106 forms a layer in contact with reflective surface 104, such that absorbent surface 106 lies between reflective surface 104 and thermal transfer unit 110. In an alternate embodiment of the present invention, absorbent surface 106 lies between reflective surface 104 and thermal transfer unit 110, without being in direct contact with either. In one embodiment of the present invention, reflective surface 104 lies between absorbent surface 106 and thermal transfer unit 110.

Reflective surface 104 and absorbent surface 106 are designed together such that the solar radiation having wavelengths not absorbed by absorbent surface 106 are reflected by reflective surface 104. Reflective surface 104 and absorbent surface 106 are complementary. Dual capture panel 102, by rejecting fewer solar radiation wavelengths, has a higher efficiency than a panel involving only photovoltaics or only a mirrored surface. Higher efficiencies translate to greater power output per unit area than a conventional system.

The focus point, as described herein, of dual capture panel 102 lies on receiving zone 112 of thermal transfer unit 110. Thermal transfer unit 110 includes receiving zone 112, heat engine 114, and generator 116. Thermal transfer unit 110 is connected to dual capture panel 102 at some distance above dual capture panel 102 in consideration of the shape and diameter of dual capture panel 102 and reflecting wavelength 10, such that the focus point of dual capture panel 102 is on receiving zone 112.

Figure 3:
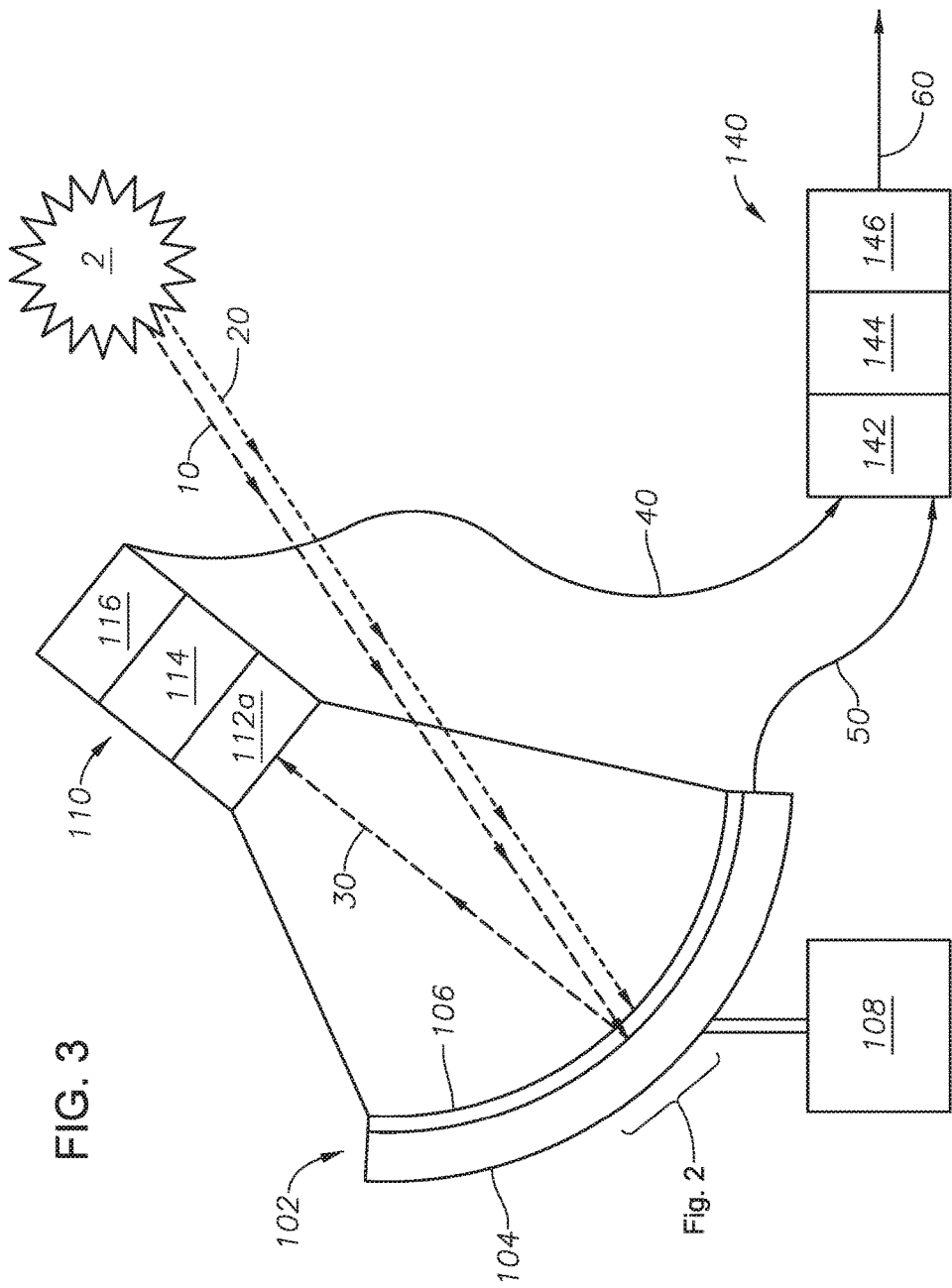
FIG. 3 is a schematic of an embodiment of the dual-type solar power generator.

Receiving zone 112 is configured to absorb heat energy from reflected stream 30 to heat a fluid to create a heated fluid (not shown). The heated fluid is used in a heat based power generator, such as heat engine 114. In one embodiment of the present invention, as described with reference to FIG. 3, receiving zone 112 is fluid tank 112a. In an alternate embodiment of the present invention, receiving zone 112 is a thermal coating on the exterior of heat engine 114. The fluid is any type of fluid capable of absorbing heat.

Heat engine 114 converts the heat energy of the heated fluid to mechanical work. Heat engine 114 is any type of heat engine capable of converting heat energy to mechanical work. In a preferred embodiment, heat engine 114 is a Stirling Engine type heat engine (not shown), using the movement of a piston (not shown) to turn a wheel (mechanical work energy) (not shown). In a Stirling Engine, the piston moves between the heated fluid and a cold fluid (not shown).

Generator 116 converts the mechanical work energy generated by heat engine 114 to electric current 40. Generator 116 is any type of generator configured to convert mechanical work energy to electricity. In a preferred embodiment of thermal transfer unit 110, the wheel of the Stirling Engine is connected to generator 116. One of skill in the art will appreciate that the voltage of electric current 40 depends on the design of dual capture panel 102, reflective surface 104, and thermal transfer unit 110.

Dual-type solar power generator 100 includes electric conditioning system 140. Electrical conditioning system 140 is configured to receive released electron stream 50 and electric current 40 to create power source 60. Electric conditioning system 140 includes electrical buffer 142, power converter 144, and electrical connector 146.

Electrical buffer 142 is configured to prevent a backflow of electricity from released. electron stream 50 to electric current 40 or from electric current 40 to electron stream 50. Electrical buffer 142 can be any type of voltage buffer amplifier configured to prevent the cross flow of released electron stream 50 and electric current 40. In an embodiment of the present invention, electrical buffer 142 includes a first diode (not shown) positioned in released electron stream 50 and a second diode (not shown) positioned in electric current 40.

Power converter 144 is configured to adjust the voltage of either the released electron stream 50, or electric current 40, or both, so that the voltages are equalized. In this context, equalized means that the voltage of released electron stream 50 is equal to the voltage of electric current 40.

Electrical connector 146 is configured to combine released electron stream voltage (not shown) with electric current voltage (not shown) to create power source 60.

In some embodiments of the present invention, dual-type solar power generator 100 includes tracking system 108. Tracking system 108 is configured to orient dual capture panel 102 toward solar radiation source 2. Tracking system 108 repositions dual capture panel 102 based on the position of solar radiation source 2 in order to maximize the amount of solar radiation of both reflecting wavelength 10 and absorbent wavelength 20 that hits the dual capture panel 102. In at least one embodiment of the present invention, tracking system 108 allows dual capture panel 102 to track solar radiation source 2 along a single axis as the position of solar radiation source 2 changes with respect to the surface of the earth. Tracking system 108 maintains the angle necessary to maximize efficiency of dual capture panel 102. It will be appreciated by one of skill in the art that the angle at which solar radiation hits dual capture panel 102 affects the ability of dual capture panel 102 to reflect or absorb the wavelengths of solar radiation. In at least one embodiment of the present invention, tracking system 108 includes a gimbal motor allowing movement of dual capture panel 102 along multiple axes. Providing for movement in multiple axes allows dual capture panel 102 to adjust its position relative to solar radiation 2 throughout a single day and throughout a year. Tracking system 108 can be manual or automated.

Dual-type solar power generator 100 can be used in locations where there is limited space. Environments where a small footprint is necessary include, for example, offshore platforms, dense urban environments (e.g. Seoul, Manila, Paris), and seagoing vessels.

Dual-type solar power generator 100 can be used in a number of applications where space might be limited. Dual-type solar power generator 100 can be used to power a plurality of sensors (not shown). Such applications include providing power to a home to replace all or part of the power supplied from the electric grid, providing power to a system of sensors, such as on an offshore platform or a seagoing vessel.

In at least one embodiment of the present invention, the configuration of reflective surface 104 and absorbent surface 106 achieves enhanced efficiency because reflective surface 104 reflects electromagnetic radiation of a wavelength longer than a critical wavelength, $\lambda c$, so it is reflected and absorbed by thermal transfer unit 110 at the focus. Electromagnetic radiation with a wavelength shorter than $\lambda c$ will pass through reflective surface 104 and be converted into electrical energy at the PV cell of absorbent surface 106. The precise value of $\lambda c$ is selected or tailored as appropriate through engineering the band gap of the PV cell of absorbent surface 106—such techniques should be well understood by one well versed in the art of semiconductor processing. In at least one embodiment, $\lambda c$ falls in the 1-5 µm range. In a preferred embodiment, the response would be a step function, but it is understood this could be a more gradual transition in reflectivity as a function of wavelength—in this case the center frequency of the transition should be taken as $\lambda c$.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed is:

1. A dual-type solar power generator, the dual-type solar power generator comprising:
    a dual capture panel, wherein the dual capture panel comprises:
        a reflective surface, wherein the reflective surface is configured to reflect solar radiation having a reflecting wavelength to create a reflected stream; and
        an absorbent surface, wherein the absorbent surface is configured to absorb solar radiation having an absorbent wavelength to create a released electron stream;
    a thermal transfer unit, the thermal transfer unit comprising:
        a receiving zone being configured to receive the reflected stream and to absorb heat energy from the reflected stream;
        a heat engine, the heat engine being in thermal communication with the receiving zone, wherein the heat engine converts the heat energy absorbed by the receiving zone and converts the heat energy to mechanical work energy; and
        a generator, the generator in mechanical communication with the heat engine, wherein the generator is configured to convert the mechanical work energy to an electric current;
    an electric conditioning system, the electric conditioning system in electrical communication with the released electron stream and the electric current, the electric conditioning system comprising:
        an electrical buffer, the electrical buffer configured to prevent a cross flow of the released electron stream and the electric current;
        a power converter, the power converter configured to equalize a released electron stream voltage with an electric current voltage;
        an electrical connector, the electrical connector configured to combine the released stream voltage with the electric current voltage to create a power source,
    wherein the absorbent surface forms a layer contacting the reflective surface and positioned between the reflective surface and the thermal transfer unit.

2. The dual-type solar power generator of claim 1, wherein the dual capture panel has a parabolic shape with a focus point.

3. The dual-type solar power generator of claim 2, wherein the receiving zone is positioned at the focus point.

4. The dual-type solar power generator of claim 1, wherein the reflecting wavelength reflected by the reflective surface is greater than 1000 nm.

5. The dual-type solar power generator of claim 1, wherein the absorbent wavelength absorbed by the absorbent surface is less than 1000 nm.

6. The dual-type solar power generator of claim 1, wherein the absorbent surface comprises a photovoltaic cell, wherein the photovoltaic cell is selected from the group consisting of mesh filter, interference filter, diffraction grating, and combinations thereof.

7. The dual-type solar power generator of claim 1, wherein the receiving zone includes a fluid tank,
    wherein a fluid receives the heat energy to create heated fluid, the fluid tank being fluidly connected to the heat engine.

8. The dual-type solar power generator of claim 1, wherein the heat engine is a Stirling Engine.

9. The dual-type solar power generator of claim 1, wherein the electrical buffer comprises a first diode in the released electron stream and a second diode in the electric current.

10. The dual-type solar power generator of claim 1 further comprising a tracking system, the tracking system configured to orient the dual capture panel toward a source of the solar radiation.

11. The dual-type solar power generator of claim 1, wherein the dual-type solar power generator is operable to power a plurality of sensors.

12. The dual-type solar power generator of claim 1, wherein the solar power generator is used on an offshore platform, where there is limited space.

13. A method of generating dual-type solar power, the method comprising the steps of:
    capturing solar radiation with a dual capture panel, wherein the dual capture panel comprises a reflecting surface and an absorbent surface;
    reflecting solar radiation having a reflecting wavelength with the reflecting surface to create a reflected stream;
    absorbing solar radiation having an absorbent wavelength with the absorbent surface to create a released electron stream;
    converting a solar energy of the reflected stream to an electric current in a thermal transfer unit, wherein the absorbent surface forms a layer contacting the reflective surface and positioned between the reflective surface and the thermal transfer unit, the thermal transfer unit comprising a receiving zone, a heat engine, and a generator, wherein converting the solar energy to an electric current in the thermal transfer unit comprises the steps of:
heating a fluid in the receiving zone with the reflected stream to create a heated fluid having a heat energy;
converting the heat energy of the heated fluid to mechanical work energy in the heat engine, the heat engine being fluidly connected to the receiving zone; and
converting the mechanical work energy to the electric current in a generator, the generator being mechanically connected to the heat engine;
combining the electric current and the released electron stream in an electric conditioning system, the electric conditioning system comprising:
an electrical buffer configured to prevent a cross flow of the released electron stream and the electric current;
a dc-to-dc converter, the dc-to-dc converter configured to equalize a released electron stream voltage with an electric current voltage; and
an electrical connector, the electrical connector configured to combine the released stream voltage with the electric current voltage to create a power supply.

* * * * *